(12) United States Patent
Matsui et al.

(10) Patent No.: US 9,213,150 B2
(45) Date of Patent: Dec. 15, 2015

(54) OPTICAL COUPLING APPARATUS AND OPTICAL TRANSCEIVER INSTALLING THE SAME

(71) Applicants: Sumitomo Electric Industries, Ltd., Osaka-shi (JP); SEI Optifrontier Co., Ltd., Yokohama (JP)

(72) Inventors: Takashi Matsui, Yokohama (JP); Hiromi Kurashima, Yokohama (JP); Masahiro Shibata, Chigasaki (JP)

(73) Assignees: Sumitomo Electric Industries, Ltd., Osaka-shi (JP); SEI Optifrontier Co., Ltd., Yokohama-shi (JP)

( * ) Notice: Subject to any disclaimer, the term of this patent is extended or adjusted under 35 U.S.C. 154(b) by 0 days.

(21) Appl. No.: 14/579,781

(22) Filed: Dec. 22, 2014

(65) Prior Publication Data

US 2015/0185423 A1 Jul. 2, 2015

(30) Foreign Application Priority Data

Dec. 26, 2013 (JP) .................................. 2013-268534

(51) Int. Cl.
 *G02B 6/38* (2006.01)
(52) U.S. Cl.
 CPC ..................................... *G02B 6/389* (2013.01)

(58) Field of Classification Search
 CPC ....................................................... G02B 6/389
 USPC ........................................................ 385/77–90
 See application file for complete search history.

(56) References Cited

U.S. PATENT DOCUMENTS

| | | |
|---|---|---|
| 5,588,080 A | 12/1996 | Kawamura |
| 5,915,057 A | 6/1999 | Weigel |
| 5,943,461 A * | 8/1999 | Shahid ............................. 385/92 |
| 5,953,475 A | 9/1999 | Beier et al. |
| 8,376,634 B2 | 2/2013 | Oki et al. |
| 2009/0016685 A1* | 1/2009 | Hudgins et al. ................. 385/92 |
| 2009/0052898 A1* | 2/2009 | Oki et al. ......................... 398/79 |
| 2011/0103797 A1* | 5/2011 | Oki et al. ......................... 398/79 |

* cited by examiner

*Primary Examiner* — Akm Enayet Ullah
(74) *Attorney, Agent, or Firm* — Venable LLP; Michael A. Sartori

(57) ABSTRACT

A simplified optical coupling system having two optical connectors is disclosed. The optical coupling system includes a male connector with a ferrule, a female connector with another ferrule, and a sleeve to receive the ferrules in respective ends thereof. One of connectors provides a latch and a coil spring. The latch engages with a flange of the other connector, and the coil spring put between the flange of the connector having the latch and a base of the latch to secure the engagement of the latch with the flange.

17 Claims, 7 Drawing Sheets

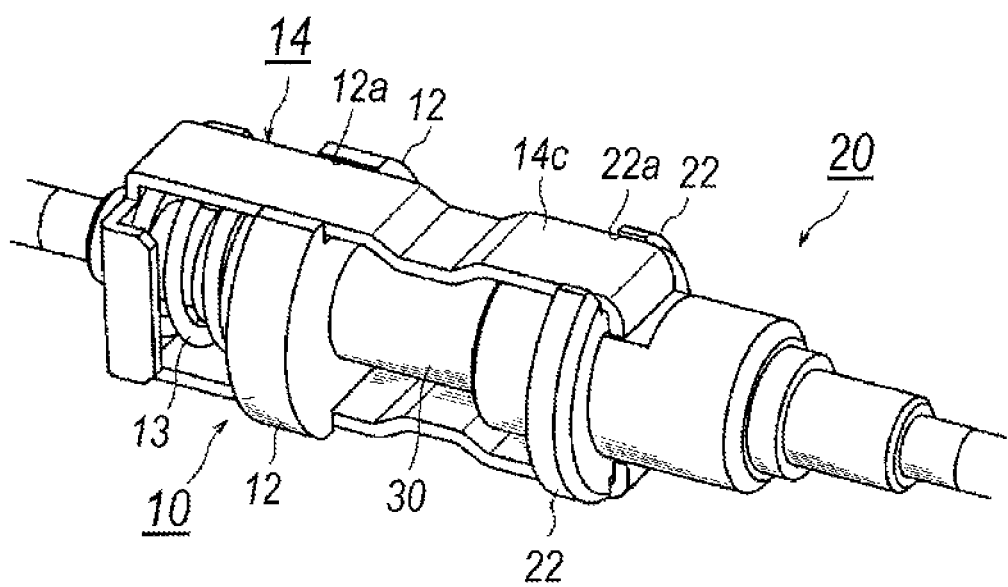

OPTICAL COUPLING APPARATUS AND OPTICAL TRANSCEIVER INSTALLING THE SAME

BACKGROUND

1. Field of the Invention

The present invention relates to an optical coupling apparatus, in particular, the invention relates to an optical coupling apparatus with a simplified structure and installed in a limited space such as an inside of an optical transceiver.

2. Background Arts

Recent optical communication systems often install a wavelength division multiplexing (WDM) system to enhance the transmission capacity. For instance, optical transceivers following the multi-source agreements (MSA) such as CFP, QSFP (Quadrature Small Form-factor Pluggable), and so on multiplex four optical signals having wavelength grids of, for instance, CWDM (Coarse WDM) and LAN-WDM (Local Area Network WDM), on an optical fiber. Such an optical transceiver installs an optical multiplexer and/or an optical de-multiplexer to multiplex/de-multiplex optical signals optically connected with optical transducers of laser didoes and photodiodes with inner fibers.

When such optical components are connected with the arrangement of the pig-tailed fibers permanently and only one of the optical components shows a failure, all optical components installed within the optical transceiver are inevitably replaced, or at least carrying out procedures of cutting the pig-tailed fiber, replacing the failure optical component, and connecting the inner fiber of the replace component with already installed inner fiber by the fusion splicing. In order to carry out the procedures above, the installed pigtailed fibers are necessary to have surplus lengths, which dis-arranges the inside of the optical transceiver.

Some background arts have reported to connect the inner fibers with inner optical connectors. The inner optical connectors, different from ordinary connectors, are unnecessary to have the moisture resistance, the toughness, the coupling facilitation, and so on. The former two factors are secured by the housing of the optical transceiver. For the last factor, once the inner optical connectors are engaged, the disengagement of the inner connectors is not to be done until the optical components become failure. The simplified structure and the compactness consequence of the simplicity are first requested to the inner optical connector.

SUMMARY

One aspect of the present application relates to an optical coupling apparatus that comprises a first optical connector, a second optical connector, and a sleeve. The first optical connector provides a first ferrule, a first flange and a latch. The first flange is formed in a root portion of the first ferrule. The latch has a U-shape comprised of a base corresponding to a bottom bar of the U-shape and a pair of arms extending from the base. The second optical connector provides a second ferrule and a second flange. The second flange is formed in a root portion of the second ferrule. The sleeve receives the first ferrule and the second ferrule in respective ends. A feature of the optical coupling apparatus is that the base of the latch is set in a position opposite to the first ferrule with respect to the first flange and the arms of the latch engage with the second flange of the second optical connector.

Another aspect of the present application relates to an optical transceiver that installs optical components and inner fibers optically connecting the optical components. The optical transceiver of the present application comprises a housing and an optical coupling apparatus including a first optical connector, a second optical connector, and a sleeve. The first optical connector has a first ferrule attached in an end of one of the inner fibers, a first flange provided in a root portion of the first ferrule, and a latch having the base and a pair of arms extending from the base. The second optical connector has a second ferrule attached in an end of another of the inner fibers, and a second flange provided in a root portion of the second ferrule. The sleeve receives the first ferrule and the second ferrule in respective ends thereof. The arms of the latch engage with the second flange. The base and the second flange sandwiches the first flange of the first optical connector therebetween. The housing encloses the optical coupling apparatus and provides a pocket to set the optical coupling apparatus therein. A feature of the present optical transceiver is that the pocket of the housing provides a channel to set the sleeve therein and a guide in an end of the channel to receive one of the first flange and the second flange of the optical coupling apparatus.

BRIEF DESCRIPTION OF THE DRAWINGS

The foregoing and other purposes, aspects and advantages will be better understood from the following detailed description of a preferred embodiment of the invention with reference to the drawings, in which:

FIG. 2 is a perspective view showing the male connector engaged with the female connector;

DETAILED DESCRIPTION

Next, some preferred embodiments of optical transceivers according to the present application will be described as referring to accompanying drawings. In the description of the drawings, numerals or symbols same with or similar to each other will refer to elements same with or similar to each other without duplicated explanations.

Figure 1A:
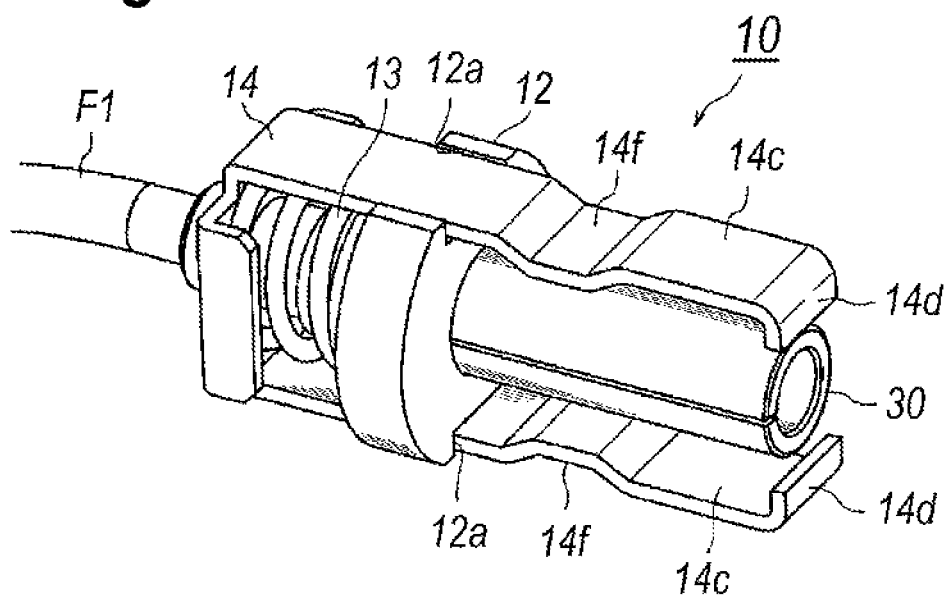
FIGS. 1A and 1B illustrate an optical connector according to an embodiment of the present invention.
Figure 1B:
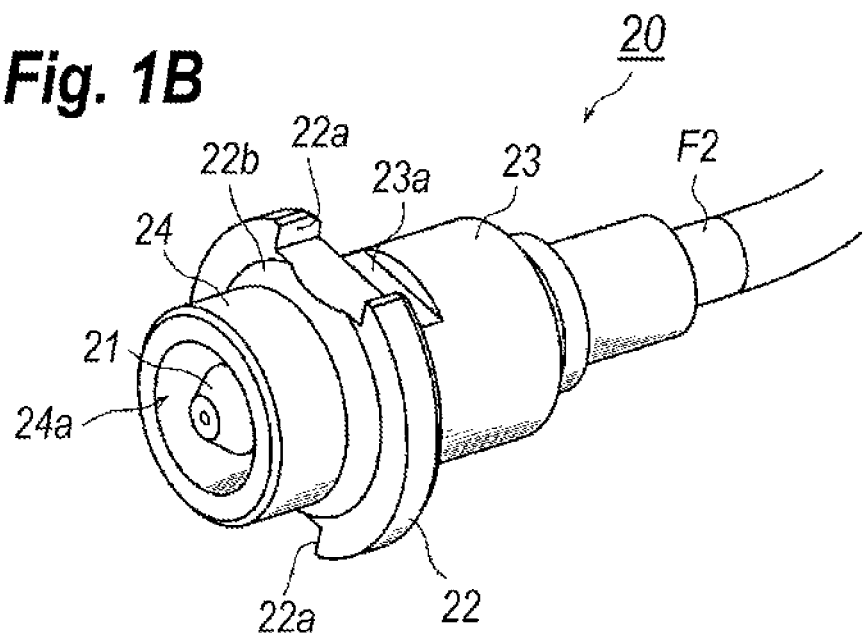

FIGS. 1A and 1B illustrate an optical connector according to an embodiment of the present invention, where FIG. 1A illustrates a male connector 10, while, FIG. 1B illustrates a female connector 20. However, the optical connector of the present embodiment cannot exactly distinguish the male connector 10 from the female connector 20 because both connectors provide respective ferrules, 11 and 21, and a sleeve 30 to receive the ferrules, 11 and 21, to couple the male connector 10 with the female connector 20.

The description presented below assumes the member shown in FIG. 1A as the male connector because the connector 20 shown in FIG. 1B provides a pocket 24a to receive the sleeve 30, while, the optical connector 20 shown in FIG. 1B is called as the female connector. The male connector 10 provides a ferrule 11 shown in FIG. 3A, which is attached to an end of an inner fiber F1, and a flange 12 in a root portion of the ferrule 11. Referring to FIG. 2, the male connector 10 also provides a coil spring 13 in an outer side of the flange 12 and a latch 14 with a U-shaped side view. A portion corresponding to a bottom bar of the U-character is attached to the coil spring 13. The latch 14 of the present embodiment may be made of metal, typically copper (Cu). However, the latch 14 may be made of resin.

Referring back to FIG. 1, the female connector 20 also provides a ferrule 21 attached in an end of another inner fiber F2. The ferrule 21 provides a flange 22 in a root portion thereof. The ferrules, 11 and 21, are preferably formed independent of respective flanges, 12 and 22, because the accuracy of the physical dimensions required to the ferrules, 11 and 21, are different from the accuracy of the flanges, 12 and 22.

FIG. 2 illustrates the male connector 10 coupled with the female connector 20 through the sleeve 30. The optical coupling between two connectors, 10 and 20, are primarily derived from the mating between the sleeve 30 and respective ferrules, 11 and 21. The latch 14 with the U-shape side view assists the coupling between two connectors, 10 and 20, by being latched with the flange 22 of the female connector 20. The present optical connector provides the coil spring 13 disposed between the flange 12 of the male connector 10 and the bottom bar of the U-shaped latch 14, then, the coil spring 13 may strengthen the engagement between the latch 14 and the flange 22. As shown in FIG. 2, even then male connector 10 is engaged with the female connector 20, the sleeve 30 is exposed.

Figure 3A:
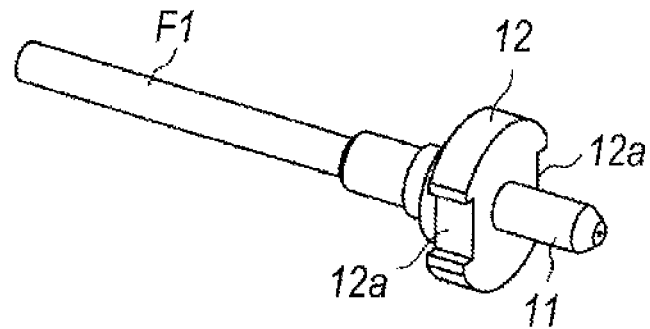
FIG. 3A illustrates the ferrule and the flange of the male connector as omitting the sleeve and the latch.
Figure 3B:
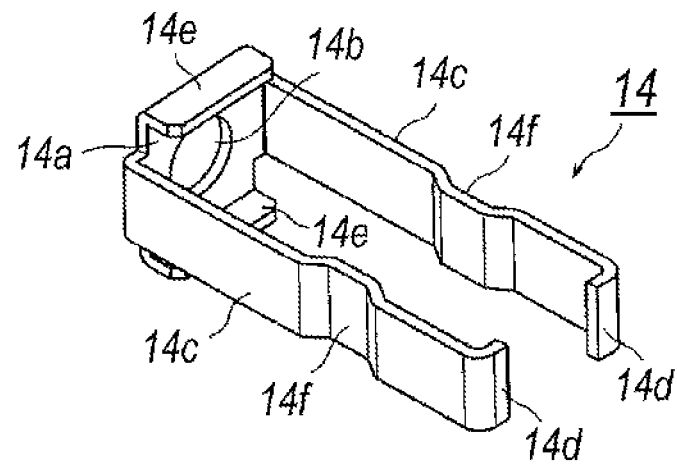
FIG. 3B illustrates the latch 14.

FIG. 3A illustrates the ferrule 11 and the flange 12 of the male connector 10, where FIG. 3A omits the sleeve 30 and the latch 14. FIG. 3B illustrates the latch 14. The flange 12, as shown in FIG. 3A, provides two cuts 12a in respective sides opposite to each other. The cuts 12a receive ends of respective vertical bars of the U-shaped latch 14. The arrangement of the vertical bars of the U-shaped latch 14 set within the cuts 12a may effectively prevent the latch 14 from rotating around the optical axis of the inner fibers, F1 and F2.

The U-shaped latch 14, as shown in FIG. 3B, comprises a base 14a with a rectangular plane shape, which corresponds to the bottom bar of the U-character, and the base 14a provides an opening 14b in a center thereof to pass the infer fiber F1 therethrough. The base 14a extends a pair of arms 14c from respective sides thereof opposite to each other toward the ferrule 11. A space between the arms 14c is substantially same with or slightly less than a distance between the cuts 12a of the flange 12. Also, the aims 14c provide hooks 14d in respective tips bent inward and preferably have widths greater than an outer diameter of the ferrule 11, further preferably substantially comparable with an outer diameter of the sleeve 30.

The base 14a also provides tabs 14e extending from rest sides opposite to each other bent toward the direction along which the arms 14c extend. These tabs 14e have two functions, one of which securely sets the coil spring 13 within a space formed between the base 14a and the flange 12. The coil spring 13 has an inner diameter greater than the outer diameter of the inner fiber F1 but the outer diameter thereof less than a space between the bent tabs 14e, which allows the coil spring 13 to be movable around the optical axis thereof but securely suppresses the movement of the coil spring 13 within the space between the flange 12 and the base 14a.

The second function of the tabs 14e is to strengthen the latch 14. When the male connector 10 is engaged with the female connector 20, the coil spring 13 is compressed between the flange 12 and the base 14a, which means that the coil spring 13 presses the base 14a outwardly. The tabs 14e of the base 14a may enhance the stiffness against the stress caused by the coil spring 13.

The arms 14c further provide saddles 14f in respective centers so as to narrow the space therebetween. The saddles 14f may distinguish two statuses of the latch 14. That is, sliding the latch 14 so as to set the saddles 14f in the side of the coil spring 13, which exposes the ferrule 11 and the insertion of the ferrule 11 into the spilt sleeve 30 is facilitated. Moreover, the arms 14c drawn rearward effectively prevent the hooks 14d in the respective tips thereof from touching to the ferrule 21 when the female connector 20 engages with the sleeve 30. On the other hand, sliding the latch 14 so as to latch the hooks 14d with the flange 22 of the female connector 20, the saddles 14f are set in the side of the ferrule 11 with respect to the flange 12.

Referring back to FIG. 1B, the female connector 20 provides the other ferrule 21 secured in an end of the other inner fiber F2. The ferrule 21 in a root portion thereof provides the flange 22 with cuts 22a formed oppositely with respect to the optical axis of the inner fiber F2. The cuts 22a, similar to the cuts 12a, have a function not to rotate the female connector 20 around the optical axis of the inner fiber F2.

The root of the flange 22 is formed in a slope 22b to assist the latch of the hooks 14d of the latch 14 with the flange 22 because the tips of the hooks 14d slide on the slope 22b. No slope is provided in an opposite side of the flange 22 to securely latch the hooks 14d with the flange 22 even when the latch 14 is pulled along the optical axis so as to separate the male connector 10 from the female connector 20. The body 23 behind the flange 22 also provides cuts 23a continuous to the cuts 22a of the flange 22. The cuts 23a of the body 23 have depths greater than the depths of the cut 22a to receive the tip of the hook 14d of the latch 14.

The flange 22 further provides a cover 24 protruding from the flange 22 frontward so as to surround the ferrule 21. The cover 24 forms a pocket 24a against the ferrule 21 to receive an end of the sleeve 30 opposite to a side receiving the ferrule 11 of the male connector 10. The cover 24 also has a function to protect the tip of the ferrule 21. The cover 24 has an inner diameter greater than the outer diameter of the sleeve 30 to facilitate the insertion of the ferrule 21 into the sleeve 30.

Figure 4:
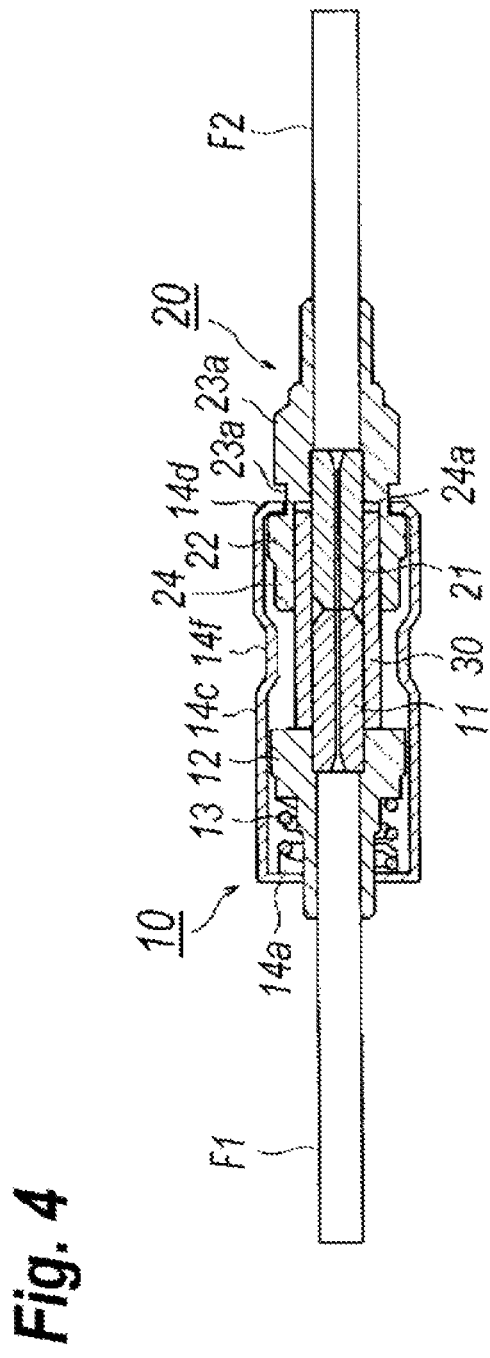
FIG. 4 shows a cross section of the optical coupling apparatus where the male connector engages with the female connector.

FIG. 4 shows a cross section where the male connector 10 mates with the female connector 20. The hooks 14d of the arms 14c in the tips thereof are set within the cuts 23a of the body. Moreover, the positions of the cuts, 12a and 22a, of respective connectors, 10 and 20, are aligned by the arms 14c. The coil spring 13 is set within the space between the body 14a and the flange 12 as being compressed therebetween to push the base 14a so as to be apart from the flange 12, which securely latches the hook 14d with the flange 22 of the female connector 20. When the hook 14d is engaged with the flange 22, the saddles 14f of respective arms position in the middle between two flanges, 12 and 22.

Also, when the two connectors, 10 and 20, are engaged, the ferrules, 11 and 21, are set within the sleeve 30 and respective ends of the ferrules, 11 and 21, come in physically contact to realize the optical coupling between two inner fibers, F1 and F2. The tip of the sleeve 30 is apart from the deep end of the pocket 24a in the female connector 20. As described, the coil spring 13 pushes the flange 12 of the male connector 10 toward the female connector 20, while, pulls the flange 22 of the female connector 20 toward the mail connector 10 by pushing the base 14a so as to apart from the flange 12 and lathing the hook 14d with the flange 22. This mechanism of the coil spring 13, the latch 14, two flanges, 12 and 22, and the sleeve 30 forming a gap against the deep end of the pocket 24a makes the physical contact between the ends of respective ferrules, 11 and 21, stable and secure.

Figure 5:
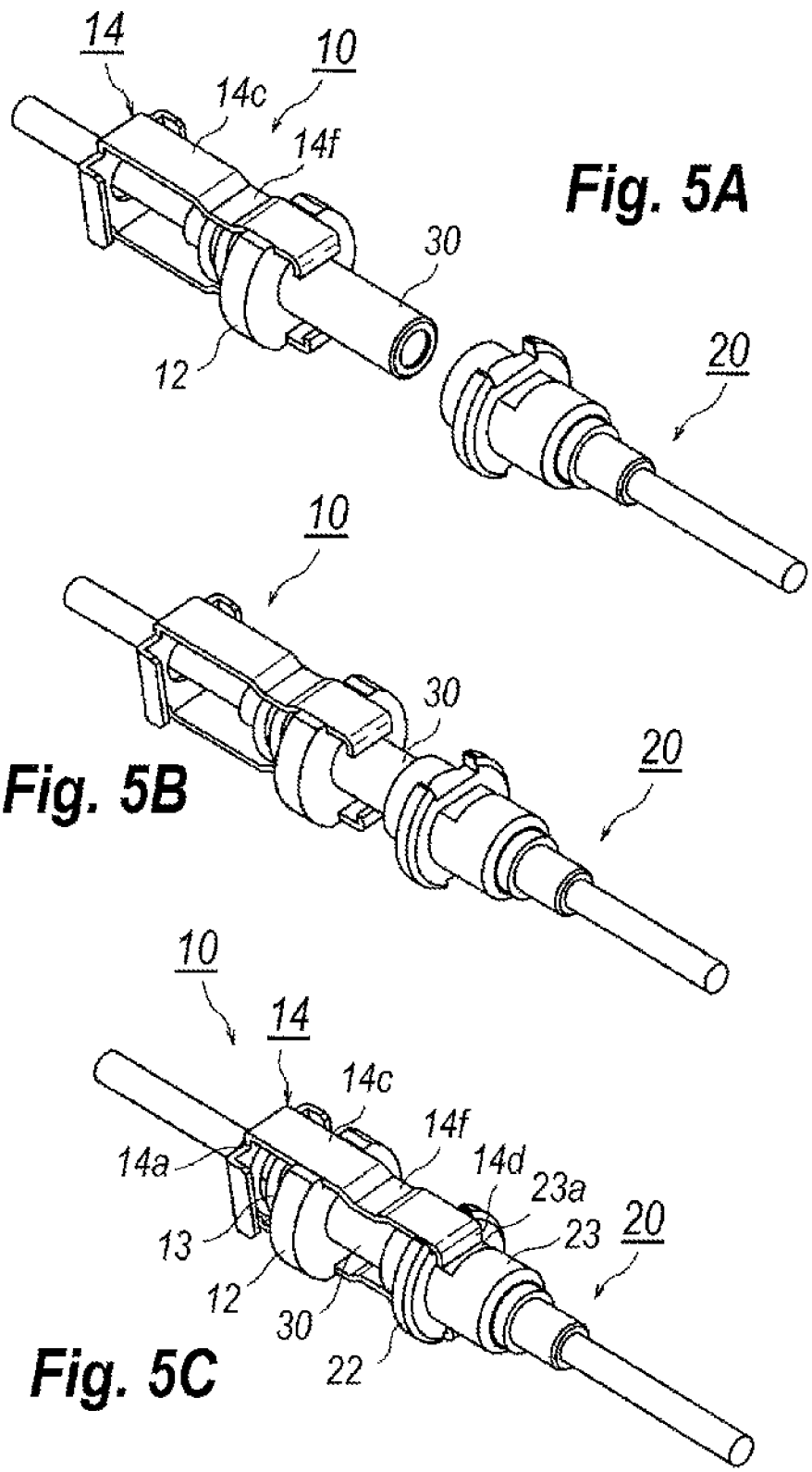
FIGS. 5A to 5C explain the procedures to engage the male connector with the female connector.

FIGS. 5A to 5C explain the procedures to engage the male connector 10 with the female connector 20. First, as shown in FIG. 5A, the latch 14 is pulled rearward to expose the ferrule 11 of the mail connector 10, and attaches the sleeve 30 to the exposed ferrule 11. In this state, the saddles 14f positions behind the flange 12 to show the function not to slide the arms 14c frontward.

Then, as shown in FIG. 5B, the sleeve 30 is set within the pocket 24a of the female connector 20 to abut the end of the ferrule 11 against the ferrule 21 of the female connector 20. Finally, as shown in FIG. 5C, the arms 14c slide toward the female connector 20 such that the saddles 14f get over the flange 12 of the male connector 10, and hooks 14d are set within the cuts 23a of the body 23 to engage the hooks 14d with the flange 22 of the female connector 20. During the slide of the arms 14c shown in FIG. 5C, the coil spring 13 is compressed between the base 14a and the flange 12 to shorten the length thereof shorter than the free length to push the base 14a rearward which securely engages the hooks 14d with the flange 22 of the female connector 20. The female connector 20 may be disengaged from the mail connector 10 by pressing the saddles 14f to de-latch the hook 14d from the flange 22.

As described, the total length of the sleeve 30 is set to be shorter than a distance between flanges, 12 and 22, when two connectors, 10 and 20, are engaged, which means that the tip of the sleeve 30 is apart from the deep end of the pocket 24a, or the other end of the sleeve 30 is apart from the flange 12. This makes the physical contact between the ends of the ferrules, 11 and 21, secure.

The mechanism of two connectors, 10 and 20, thus described enhances the retention along the optical axis but substantially no functions or no effects along directions perpendicular to the optical axis. The retention perpendicular to the optical axis solely depends on the function of the sleeve 30 to hold the ferrules, 11 and 21. The connectors, 10 and 20, of the present embodiment have a feature that they have no housings to retain the ferrules, 11 and 21, perpendicular to the optical axis because the connectors, 10 and 20, are assumed to be practically used in a narrower housing and an application of infrequent latching/de-latching system.

Figure 6:
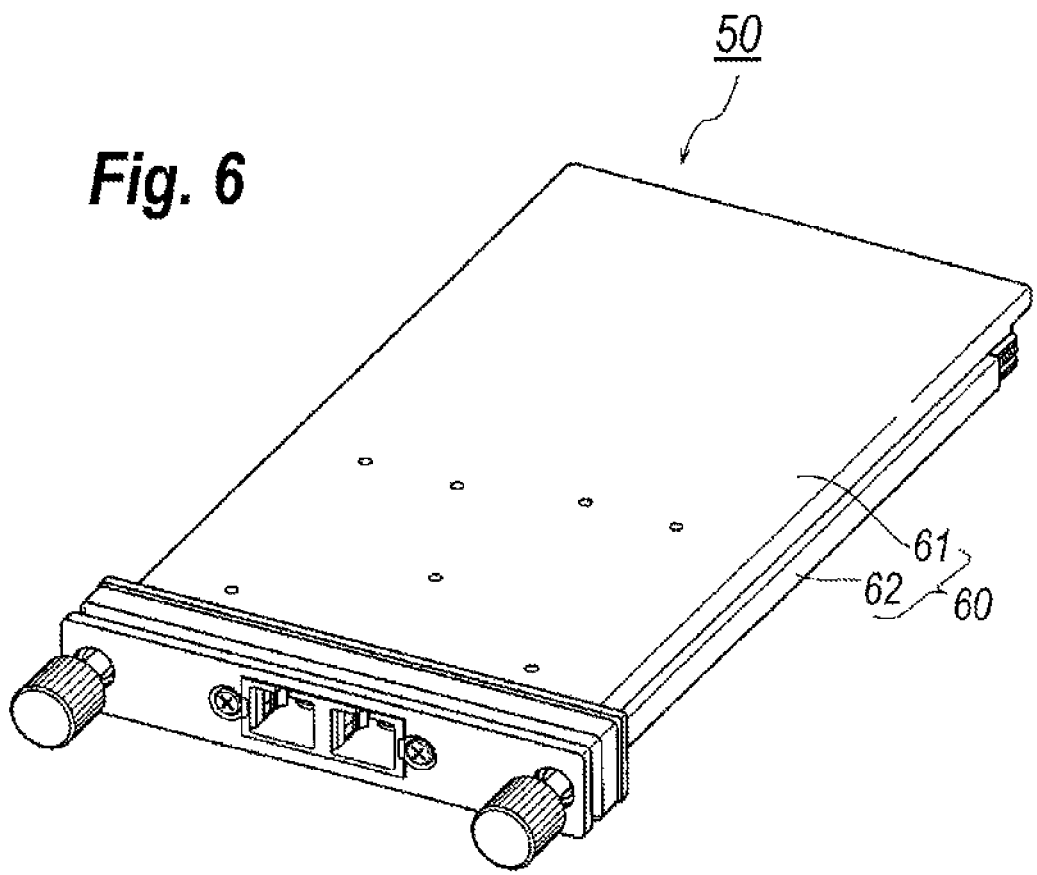
FIG. 6 is an outer appearance of an optical transceiver into which the optical connectors are to be installed.
Figure 7A:
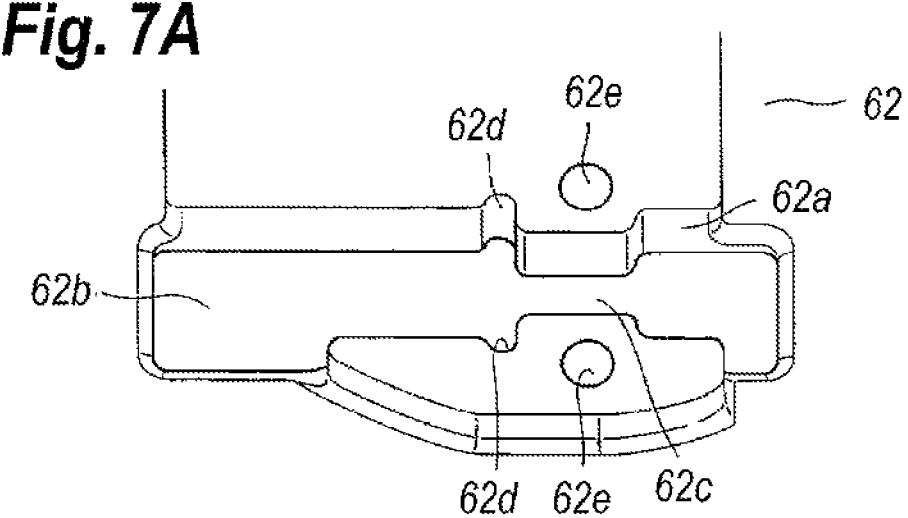
FIGS. 7A to 7C explain an embodiment to install the optical connectors within the housing and to engage to each other.
Figure 7B:
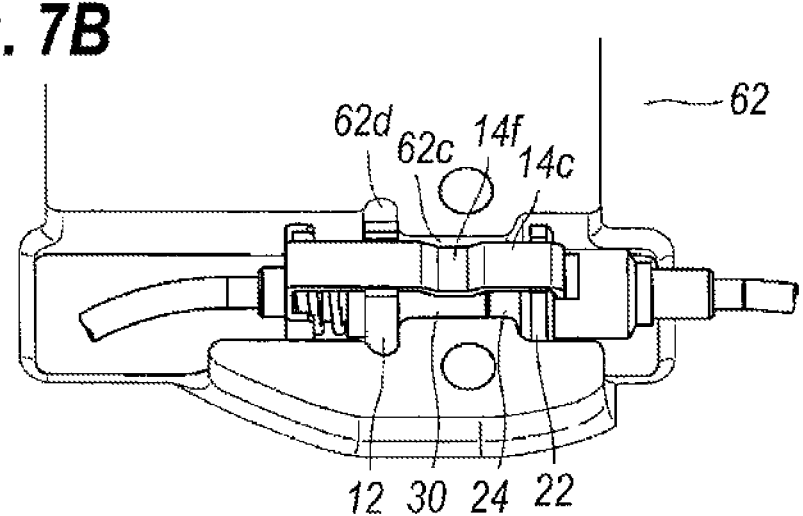
Figure 7C:
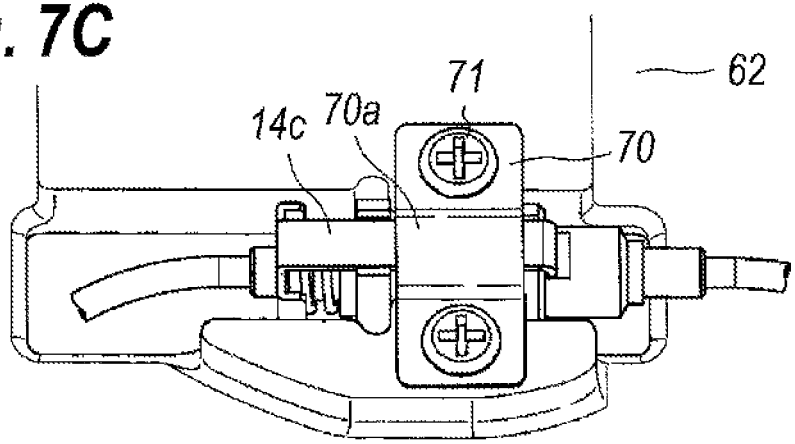

FIG. 6 shows an outer appearance of an optical apparatus into which the optical connectors, 10 and 20, thus described are to be installed. The optical apparatus 50 shown in FIG. 6 provides a housing comprised of an upper housing and a lower housing to form a space to install optical electrical components including the optical connectors, 10 and 20. FIGS. 7A to 7C explain an embodiment to install the optical connectors, 10 and 20, within the housing 60 and to engage to each other. The bottom housing 62, as shown in FIG. 7A, provides a pocket 62b surrounded by walls 62a. The pocket 62b has a channel 62c with a width narrower than widths of rest portions of the pocket 62b. The channel 62c accompanies with guides 62d in respective side walls 62a in one end thereof and screw holes 62e.

The optical connectors, 10 and 20, are set within the pocket 62a such that the sleeve 30 is set in the channel 62c and one of the flanges, 12 and 22, is set within the guides 62d, as shown in FIG. 7B. The length of the channel 62c is substantially equal to a span between the flanges, 12 and 22, in the state where the latch 14 is engaged with the flange 22. Also, the width of the channel 62c is substantially equal to an outer diameter of the cover 24. Thus, the optical connectors, 10 and 20, engaged with each other may be set within the channel 62c with substantially no rickety.

Finally, a presser bar 70 is fixed to the bottom housing 62 by screws 71 so as to cover the latch 14 and install the engaged optical connectors, 10 and 20, in the bottom housing 62. The presser bar 70 provides a center pocket 70a with a width substantially equal to a width of the arm 14c to prevent the arm 14c from being rebounded out and releasing the engagement with the flange 22 of the female connector 20. Moreover, the presser bar 70 provides a projection in a position counter to the pocket 70a, which is not illustrated in FIG. 7C, set within the saddle 14f of the arm 14c. The projection has a length along the arm 14c substantially equal to a length of the saddle 14f along the arm 14c. Accordingly, the projection of the presser bar 70 effectively prevents the arm 14c from sliding along the sleeve 30.

Although the embodiment shown in FIG. 7A provides the guides 62d only in one side of the channel 62c, other guides may be provided in the other end of the channel 62c to receive the flange 22 of the female connector 20.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical coupling apparatus, comprising:
    a first optical connector providing a first ferrule, a first flange and a latch, the first flange being formed in a root portion of the first ferrule, the latch having a U-shape comprised of a base corresponding to a bottom bar of the U-shape and a pair of arms extending from the base;
    a second optical connector providing a second ferrule and a second flange, the second flange being formed in a root portion of the second ferrule; and
    a sleeve configured to receive the first ferrule and the second ferrule in respective ends thereof,
    wherein the base of the latch is set in a position opposite to the first ferrule with respect to the first flange and the arms of the latch engage with the second flange of the second optical connector.

2. The optical coupling apparatus of claim 1,
    wherein the first connector further provides a coil spring set between the base of the latch and the first flange, the coil spring pushing the first flange toward the second connector and the base toward a direction opposite to the second optical connector.

3. The optical coupling apparatus of claim 1,
    wherein the arms of the latch provide hooks bent inward in respective ends thereof, the hooks being engaged with the second flange of the second optical connector.

4. The optical coupling apparatus of claim 3,
    wherein the second flange provides cuts to receive respective arms of the latch.

5. The optical coupling apparatus of claim 4,
    wherein the second connector provides a body in a position opposite to the second ferrule with respect to the second flange, the body providing cuts continuous to the cuts of the second flange, the cuts of the body receiving the bent ends of respective hooks.

6. The optical coupling apparatus of claim 3,
    wherein the first flange provides cuts to pass respective arms.

7. The optical coupling apparatus of claim 1,
    wherein the second ferrule provides a slope in a root portion thereof.

8. The optical coupling apparatus of claim 1,
wherein the arms provide saddles set between the first flange and the second flange.

9. The optical coupling apparatus of claim 1,
wherein the second optical connector provides a cover surrounding the second ferrule, the cover forming a pocket against the second ferrule to receive the sleeve therein.

10. The optical coupling apparatus of claim 9,
wherein the sleeve has a length shorter than a distance between the first flange and the second flange.

11. An optical transceiver that installs optical components and inner fibers optically connecting the optical components, comprising:
an optical coupling apparatus including a first optical connector, a second optical connector, and a sleeve,
wherein the first optical connector has a first ferrule attached in an end of one of the inner fibers, a first flange provided in a root portion of the first ferrule, and a latch having the base and a pair of arms extending from the base,
wherein the second optical connector has a second ferrule attached in an end of another of the inner fibers, and a second flange provided in a root portion of the second ferrule,
wherein the sleeve receives the first ferrule and the second ferrule in respective ends thereof, and
wherein the arms of the latch engages with the second flange, the base and the second flange putting the first flange of the first optical connector therebtween; and
a housing to enclose the optical coupling apparatus and provide a pocket to set the optical coupling apparatus therein,
wherein the pocket of the housing provides a channel to set the sleeve therein and a guide in an end of the channel to receive one of the first flange and the second flange of the optical coupling apparatus.

12. The optical transceiver of claim 11,
wherein the first optical connector further provides a coil spring set between the base of the latch and the first flange, the coil spring pushing the first flange toward the second optical connector and the base toward a direction opposite to the second optical connector.

13. The optical transceiver of claim 11,
wherein the arms of the latch provide hooks bent inward in respective ends thereof, the hooks being engaged with the second flange of the second connector.

14. The optical transceiver of claim 13,
wherein the first flange provides cuts to pass respective arms therethrough and the second flange provides another cuts to receive respective arms.

15. The optical transceiver of claim 11,
wherein the arms provide saddles in a position between the first flange and the second flange.

16. The optical transceiver of claim 11,
wherein the second optical connector provides a cover surrounding the second ferrule, the cover forming a pocket against the second ferrule to receive the sleeve therein, and
wherein the sleeve has a length shorter than a distance between the first flange and the second flange.

17. The optical transceiver of claim 11,
further comprising a presser bar to hold the optical coupling apparatus, in the channel,
wherein the presser bar provides a pocket to receive the arms and the sleeve therein.

* * * * *